(12) United States Patent
Lee et al.

(10) Patent No.: US 11,650,069 B2
(45) Date of Patent: May 16, 2023

(54) CONTENT VISUALIZING METHOD AND DEVICE

(71) Applicant: Samsung Electronics Co., Ltd., Suwon-si (KR)

(72) Inventors: HeeSae Lee, Yongin-si (KR); KeeChang Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/946,767

(22) Filed: Apr. 6, 2018

(65) Prior Publication Data

US 2019/0178669 A1 Jun. 13, 2019

(30) Foreign Application Priority Data

Dec. 13, 2017 (KR) .......................... 10-2017-0171411

(51) Int. Cl.
*G01C 21/36* (2006.01)
*B60K 35/00* (2006.01)
*G02B 27/01* (2006.01)
*G06F 3/01* (2006.01)

(52) U.S. Cl.
CPC ............ *G01C 21/365* (2013.01); *B60K 35/00* (2013.01); *G02B 27/0179* (2013.01); *G06F 3/013* (2013.01); *B60K 2370/1529* (2019.05); *B60K 2370/166* (2019.05); *B60K 2370/31* (2019.05); *B60K 2370/347* (2019.05); *G02B 2027/0181* (2013.01)

(58) Field of Classification Search
CPC ....... G01C 21/365; G01C 21/26; G06F 3/013; G02B 27/0179; G02B 2027/0181; G02B 2027/0183; G02B 2027/0185; G02B 2027/0141; G02B 27/01; B60K 2370/347; B60K 35/00; B60K 2370/31; B60K 2370/166; B60K 2370/1529
USPC ........................................................ 701/431
See application file for complete search history.

(56) References Cited

U.S. PATENT DOCUMENTS

| 8,265,869 | B2 * | 9/2012 | Katou ................ G01C 21/3655 |
| | | | 701/431 |
| 9,637,118 | B2 * | 5/2017 | Yokota .................... H04N 5/232 |
| 9,678,341 | B2 * | 6/2017 | Kim ...................... G02B 30/27 |
| 10,029,700 | B2 * | 7/2018 | Roth ........................ G08G 1/00 |
| 10,215,583 | B2 * | 2/2019 | Ng-Thow-Hing ..... H04N 7/188 |
| 10,339,711 | B2 * | 7/2019 | Ng-Thow-Hing ..... G02B 27/01 |

(Continued)

FOREIGN PATENT DOCUMENTS

| JP | 2006-284458 A | 10/2006 |
| JP | 5805341 B1 | 11/2015 |

(Continued)

OTHER PUBLICATIONS

Korean Office Action dated Aug. 3, 2022, in counterpart Korean Patent Application No. 10-2017-0171411 (12 pages in English and 15 pages in Korean).

*Primary Examiner* — Fadey S. Jabr
*Assistant Examiner* — Mohamed Abdo Algehaim
(74) *Attorney, Agent, or Firm* — NSIP Law

(57) ABSTRACT

Provided are a content visualizing device and method that changes positions and shapes of route guidance content and driving related content based on a distance to an adjacent object, a current driving state, and an occurrence of a driving related event.

18 Claims, 14 Drawing Sheets

(56) References Cited

U.S. PATENT DOCUMENTS

| | | | |
|---|---|---|---|
| 2009/0140887 A1* | 6/2009 | Breed | G01C 21/165 340/990 |
| 2010/0157430 A1* | 6/2010 | Hotta | G02B 27/01 359/630 |
| 2010/0250116 A1* | 9/2010 | Yamaguchi | G01C 21/3647 701/533 |
| 2011/0238294 A1* | 9/2011 | Shikimachi | G01C 21/32 701/533 |
| 2013/0253830 A1* | 9/2013 | Breisinger | G01C 21/00 701/533 |
| 2013/0289875 A1* | 10/2013 | Kumon | G01C 21/3632 701/533 |
| 2014/0052370 A1* | 2/2014 | Watanabe | G01C 21/3638 701/428 |
| 2014/0188388 A1* | 7/2014 | Malahy | G01C 21/367 701/533 |
| 2014/0192181 A1* | 7/2014 | Taylor | B60C 23/0408 348/118 |
| 2015/0211877 A1* | 7/2015 | Laycock | G02B 3/14 701/444 |
| 2015/0221220 A1* | 8/2015 | Arai | G08G 1/09 340/907 |
| 2015/0226568 A1* | 8/2015 | Ann | G01C 21/36 701/400 |
| 2015/0226965 A1 | 8/2015 | Kim et al. | |
| 2015/0260534 A1* | 9/2015 | Shen | G01C 21/34 701/408 |
| 2015/0331487 A1* | 11/2015 | Roth | G06F 3/013 345/156 |
| 2015/0334269 A1* | 11/2015 | Yokota | H04N 5/232 382/103 |
| 2016/0003636 A1* | 1/2016 | Ng-Thow-Hing | H04N 7/188 701/26 |
| 2016/0327402 A1 | 11/2016 | Funabiki et al. | |
| 2017/0003134 A1* | 1/2017 | Kim | B60R 1/00 |
| 2017/0185853 A1* | 6/2017 | Yokota | H04N 5/232 |
| 2017/0236414 A1* | 8/2017 | Nishimura | B60K 35/00 382/104 |
| 2017/0276496 A1* | 9/2017 | Mannami | G01C 21/3415 |
| 2018/0058879 A1* | 3/2018 | Tayama | G09B 29/00 |
| 2018/0156627 A1* | 6/2018 | Arita | G01C 21/3679 |
| 2018/0157037 A1* | 6/2018 | Kasazumi | G09G 1/007 |
| 2018/0172991 A1* | 6/2018 | Iwashita | G02B 27/0101 |
| 2018/0297470 A1* | 10/2018 | Kim | B60K 35/00 |
| 2018/0306597 A1* | 10/2018 | Kosaka | B60K 35/00 |
| 2018/0350319 A1* | 12/2018 | Fuse | G09G 5/003 |
| 2019/0025580 A1* | 1/2019 | Nagano | G02B 27/01 |
| 2019/0041232 A1* | 2/2019 | Maruyama | G01C 21/3632 |
| 2019/0080496 A1* | 3/2019 | Wakatsuki | G06T 11/00 |
| 2019/0149607 A1* | 5/2019 | Shim | H04M 1/60 307/10.1 |
| 2019/0182435 A1* | 6/2019 | Nakayama | H04N 5/272 |
| 2019/0196187 A1* | 6/2019 | Kasazumi | B60K 35/00 |
| 2019/0204104 A1* | 7/2019 | Kimura | G02B 27/0103 |
| 2019/0359228 A1* | 11/2019 | Banno | B60W 40/072 |
| 2020/0012103 A1* | 1/2020 | Kasazumi | G02B 27/0101 |
| 2020/0210726 A1* | 7/2020 | Yang | G06N 3/08 |
| 2020/0282832 A1* | 9/2020 | Watanabe | H04N 7/18 |
| 2020/0298703 A1* | 9/2020 | Max | G02B 27/0101 |
| 2021/0016793 A1* | 1/2021 | Yamaguchi | G02B 27/01 |
| 2021/0208409 A1* | 7/2021 | Hong | B60K 35/00 |

FOREIGN PATENT DOCUMENTS

| | | |
|---|---|---|
| JP | 2015-215510 A | 12/2015 |
| KR | 10-1104503 B1 | 1/2012 |
| KR | 20-2012-0007781 U | 11/2012 |
| KR | 10-2015-0051671 A | 5/2013 |
| KR | 10-2015-0066036 A | 6/2015 |
| KR | 10-2015-0087985 A | 7/2015 |
| KR | 10-2016-0037519 A | 4/2016 |
| KR | 10-2016-0124982 A | 10/2016 |
| KR | 10-2017-0055624 A | 5/2017 |

* cited by examiner

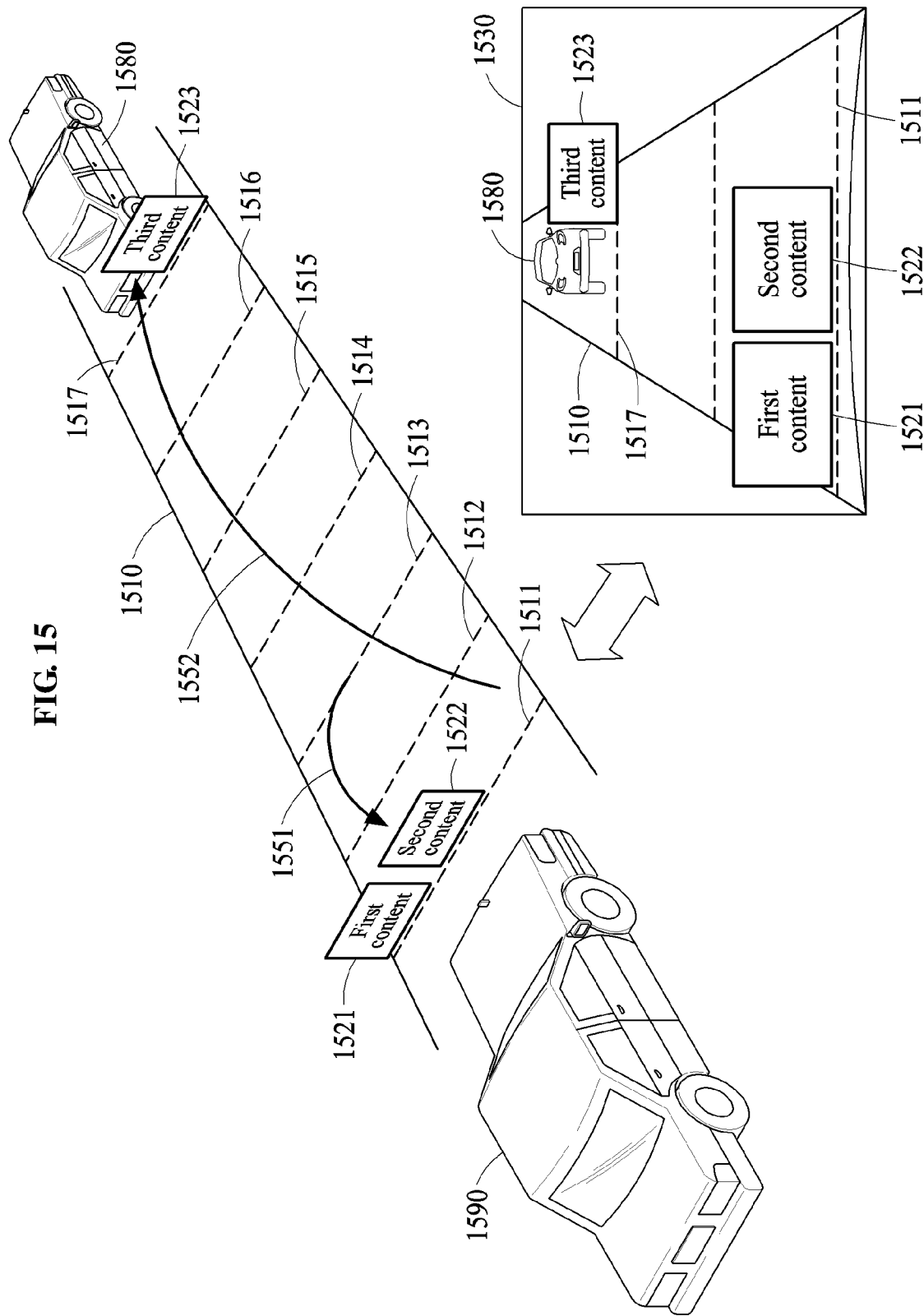

CONTENT VISUALIZING METHOD AND DEVICE

CROSS-REFERENCE TO RELATED APPLICATIONS

This application claims the benefit under 35 USC § 119(a) of Korean Patent Application No. 10-2017-0171411 filed on Dec. 13, 2017 in the Korean Intellectual Property Office, the entire disclosure of which is incorporated herein by reference for all purposes.

BACKGROUND

1. Field

The following description relates to technology that visualizes content.

2. Description of Related Art

To assist in driving, augmented reality (AR) representing a variety of visual information is provided through displays. For example, efforts have been made to match the visual information to real driving information through an AR-based head-up display (HUD) or to display a virtual image at a fixed position.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a content visualizing method, including generating route guidance content based on position information of a vehicle and road information, visualizing the generated route guidance content through a head-up display (HUD), and deforming the route guidance content along a road alignment based on a position of the vehicle and a distance to an indication end point, in response to the vehicle reaching an indication start point of the route guidance content.

The deforming of the route guidance content may include bending the route guidance content along the road alignment and a proceeding direction of the vehicle from the position of the vehicle to the indication end point, in response to the vehicle passing the indication start point and approaching the indication end point.

The visualizing may include disposing the route guidance content on a ground surface between the indication start point and the indication end point.

The visualizing may include increasing a height of the route guidance content from the ground surface, in response to a distance from the vehicle to the indication start point being less than or equal to a threshold.

The deforming may include deforming the route guidance content, in response to error information calculated from the position of the vehicle and the route guidance information being less than or equal to a threshold error, and terminating deformation of the route guidance content and generating new route guidance content, in response to the error information exceeding the threshold error.

The deforming may include setting the indication start point to be a point a first distance from the vehicle, and setting the indication end point to be a point a second distance from the vehicle, in response to the route guidance content indicating a straight advance from the position of the vehicle, wherein the second distance is greater than the first distance.

The deforming may include determining the indication start point and the indication end point along a center of a lane region to which the vehicle is to proceed based on the route guidance content.

The content visualizing method may include visualizing driving direction content together with the route guidance content, in response to the vehicle departing from a route corresponding to the route guidance content.

The deforming of the route guidance content may include visualizing summary content corresponding to the route guidance content at a depth less than a distance to a preceding object, in response to the route guidance content being occluded by the preceding object.

The visualizing may include providing a left image to a left eye of a user and a right image to a right eye of a user through a projection plane formed by the HUD.

The generating of the route guidance content may include generating the route guidance content, in response to acquisition of route guidance information.

In another general aspect, there is provided a content visualizing method, including collecting driving related information from a vehicle, visualizing driving related contents based on the driving related information in front of the vehicle through a head-up display (HUD), and adjusting a position of a driving related content corresponding to an event, among the driving related contents, in response to the event being detected from the driving related information.

The visualizing of the driving related contents may include visualizing at least a portion of the driving related contents to a first depth, and visualizing a remaining portion of the driving related contents to a second depth different from the first depth.

The visualizing of the driving related contents may include visualizing at least a portion of the driving related contents to a depth corresponding to a focus of a user of the vehicle.

The visualizing to the depth corresponding to the focus of the user may include tracking a gaze of the user, and determining a distance that the gaze of the user reaches to be the depth corresponding to the focus of the user.

The adjusting may include moving the driving related content corresponding to the event to a depth corresponding to a focus of the user.

The moving may include tracking a gaze of the user, and determining a distance that the gaze of the user reaches to be the depth corresponding to the focus of the user.

The adjusting may include moving the driving related content from a first depth to a second depth, and moving the driving related content from the second depth to the first depth, in response to the event being terminated.

The content visualizing may include detecting the event based on the driving related information comprising any one or any combination of a speed, an acceleration, a position, fuel, and a maintenance of the vehicle, selecting the driving related content from among the driving related contents based on the detected event, and adjusting and visualizing the driving related content to a depth determined based on the event.

The visualizing of the driving related contents may include providing a left image to a left eye of the user and a right image to a right eye of the user through a projection plane formed by the HUD.

In another general aspect, there is provided a content visualizing apparatus, including a processor configured to generate route guidance content based on position information of a vehicle and road information, visualize the generated route guidance content through a head-up display (HUD) of the vehicle, and deform the route guidance content along an alignment of a road based on a position of the vehicle and a distance to an indication end point of the route guidance content, in response to the vehicle reaching an indication start point of the route guidance content.

Other features and aspects will be apparent from the following detailed description, the drawings, and the claims.

BRIEF DESCRIPTION OF THE DRAWINGS

FIGS. 14 and 15 illustrate examples of adjusting a depth of driving related content in response to detection of an event.

Figure 1:
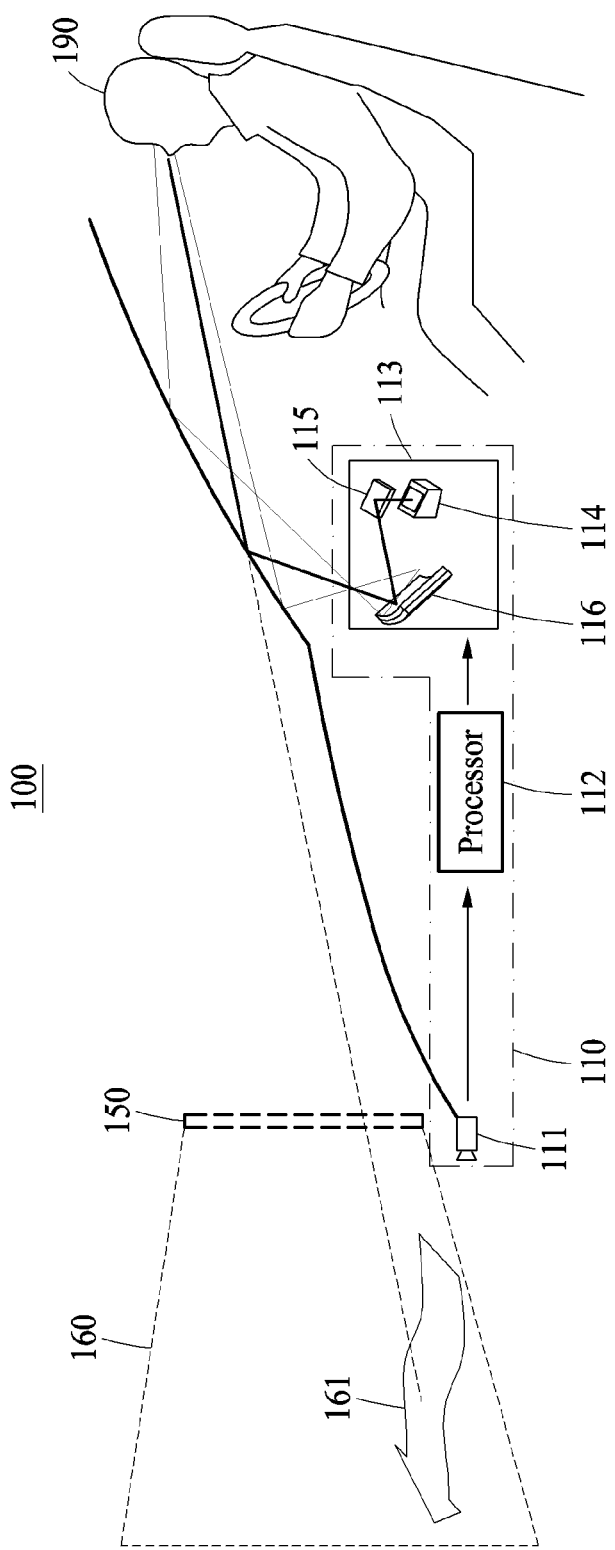
FIG. 1 illustrates an example of a content visualizing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for the purpose of describing particular examples only and is not to be limiting of the examples. As used herein, the singular forms "a", "an", and "the" are intended to include the plural forms as well, unless the context clearly indicates otherwise.

FIG. 1 illustrates an example of a content visualizing apparatus.

A content visualizing apparatus 100 provides a user 190 with content 161, and may be, for example, an apparatus on which a content visualizing device 110 is mounted.

Referring to FIG. 1, the content visualizing device 110 includes a sensor 111, a processor 112, and a head-up display (HUD) 113.

In an example, the sensor 111 detects an object in front. For example, the sensor 111 measures a distance to the object in front. However, examples are not limited thereto. In an example, the sensor 111 measures a distance to an object in a vicinity of the vehicle, and generates a vicinity distance map indicating the distance to the object in the vicinity of the vehicle. In another example, the sensor 111 generates images by capturing environments in front, in rear, on left-hand side, and on right-hand side of the vehicle.

In an example, the processor 112 generates the content 161 to be provided to the user 190 based on the detected object. For example, when the content visualizing device 110 is mounted on the vehicle, the content visualizing device 110 generates the content 161 based on information related to driving, and provides the user 190 with the content 161. In an example, the content 161 is data to provide the user 190 with information related to driving. The information relate to driving, hereinafter, the driving information, is information that is needed for driving, such as, for example, route guidance information and driving related information. In an example, the processor 112 models the object, detects a position of the object, or recognizes the object by analyzing ambient information, for example, a distance to an ambient object and an image including the object, sensed by the sensor 111.

The HUD 113 visualizes the content 161 in a visible region that is positioned in front of the user 190. For example, the HUD 113 visualizes the content 161 on a window disposed in front of the user 190, such as, for example, a front windshield of the vehicle. The HUD 113 forms a virtual projection plane 150. The projection plane 150 is a plane on which a virtual image including the content 161 generated by the HUD 113 is displayed. The user 190 recognizes the virtual image displayed on the projection plane 150.

In an example, the HUD 113 visualizes the content 161 having a depth on the projection plane 150. For example, the processor 112 determines a depth to which the content 161 is to be visualized based on the projection plane 150, and the HUD 113 visualizes, based on the determined depth, the content 161 to have a depth which is relatively far away from or close to the projection plane 150 and the user 190. The HUD 113 visualizes the content 161 having the corresponding depth in a virtual region 160 on the projection plane 150. Here, the processor 112 renders the content 161 to be a three-dimensional (3D) graphic representation based on an optical system of the HUD 113. In an example, the 3D graphic representation expresses a stereoscopic graphic representation having a depth. The HUD 113 forms the projection plane 150 including a left image and a right image based on the depth of the content 161, and provides the left image to a left eye of the user 190 and the right image to a right eye of the user 190 through the projection plane 150. Thus, the user 190 recognizes the depth of the stereoscopically rendered content 161.

The HUD 113 includes, for example, a picture generator 114, a fold mirror 115, and a concave mirror 116. However, the configuration of the HUD 113 is not limited thereto, and may include various elements designed to form the projection plane 150 on which a virtual image is focused through projection toward a display in front of the user 190.

Although an example in which the content visualizing device 110 is mounted on a vehicle is described herein, examples are not limited thereto. For example, the content visualizing device 110 may be applied to technology that combines information of a real world and information of a virtual world, such as, for example, augmented reality (AR) glasses or mixed reality (MR).

In an example, the content visualizing device 110 continuously expresses the depth by adjusting the depth of the content 161, without changing a position of the projection plane 150 formed by the HUD 113. Since a change of the position of the projection plane 150 is not needed, the content visualizing device 110 does not require a physical control of the elements included in the HUD 113. When the content visualizing device 110 is mounted on a vehicle, the content visualizing device 110 dynamically visualizes the 3D content 161 in front of a driver.

In an example, the content visualizing device 110 continuously expresses the depth through the HUD 113, and visualizes the content 161 having a depth of hundreds of meters ahead of the user 190. However, when an object, for example, another vehicle or a pedestrian, cuts in between the user 190 and the content 161 visualized to have a depth, an overlap between a 3D graphic representation corresponding to the content 161 visualized to have a depth and the object that cuts in occurs. The overlap causes a visual fatigue of the user 190, or causes a crosstalk such that the user 190 recognizes an unnatural image.

The content visualizing device 110 adjusts the content 161 to be visualized more naturally. An operation of the content visualizing device 110 will be described further below.

Figure 2:
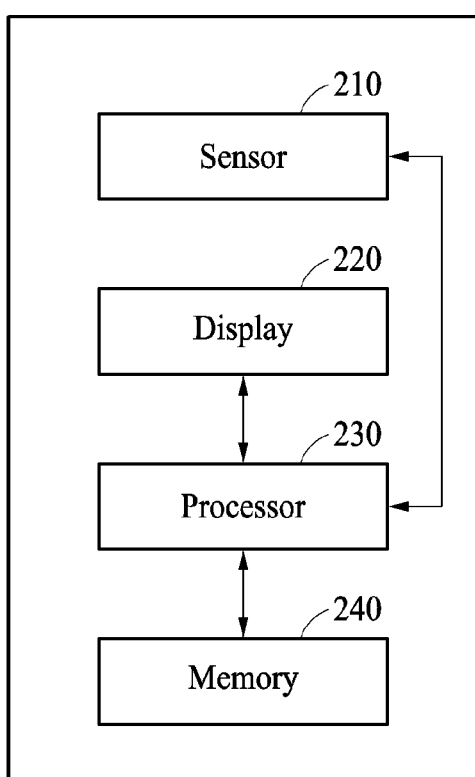
FIG. 2 illustrates an example of a content visualizing device.

FIG. 2 illustrates an example of a content visualizing device. Referring to FIG. 2, a content visualizing device 200 includes a sensor 210, a display 220, a processor 230, and a memory 240.

In an example, the content visualizing device 200 is mounted on a vehicle. In an example, vehicle described herein refers to any mode of transportation, delivery, or communication such as, for example, an automobile, a truck, a tractor, a scooter, a motorcycle, a cycle, an amphibious vehicle, a cultivator, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device.

The sensor 210 senses information for visualizing content. The sensor 210 measures a distance to an object positioned in a vicinity of a user, and include sensors, such as, for example, a light detection and ranging (LIDAR) and a radio detection and ranging (RADAR). In an example, the sensor 210 senses information related to a state of an apparatus on which the content visualizing device 200 is mounted. When the content visualizing device 200 is mounted on a vehicle, the sensor 210 senses information related to the vehicle. The sensor 210 collects, as the information related to the vehicle, position information of the vehicle, road information corresponding to a position of the vehicle, and driving related information of the vehicle. In an example, the driving related information is information such as, for example, information related to driving of the vehicle, and includes, for example, information related to a speed, an acceleration, a position, fuel, and maintenance of the vehicle.

In an example, the position information is information indicating the position of the vehicle. For example, the position information indicates current coordinates at which the vehicle is positioned, and a lane on which the vehicle is currently travelling. In an example, the sensor 210 obtains two-dimensional (2D) coordinates of the vehicle through the global positioning system (GPS). In an example, the sensor 210 acquires an image of a view ahead of the vehicle, and the processor 230 determines a lane on which the vehicle is currently travelling, for example, a second lane, among a plurality of lanes of a road from the image of the view ahead of the vehicle.

The road information is information related to a road, and includes a width of the road, the number of lanes of the road, a width of each lane, a center line, a turn point, a traffic signal, and other traffic related information. Further, the road information also includes waypoints disposed at intervals along a road alignment.

The display 220 visualizes content and provides the content to the user. In an example, the display 220 is an HUD which forms a projection plane in front of the user and provides the content to the user through the projection plane. However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the content visualizing device 200 may be used without departing from the spirit and scope of the illustrative examples described.

In an example, the display 220 provides a left image to a left eye of the user and a right image to a right eye of the user. The display 220 visualizes the content having a depth as a stereoscopic graphic object and provides the content to the user by spacing a content-visualized graphic object of the left image and a content-visualized graphic object of the right image based on a binocular disparity.

In an example, the processor 230 generates, deforms, and adjusts the content to be visualized through the display 220. The processor 230 generates route guidance content based on position information of the vehicle and road information, in response to acquisition of route guidance information. For example, the processor 230 deforms the route guidance content along a road alignment based on a position of the vehicle and a distance to an indication end point, when the vehicle reaching an indication start point of the route guidance content. The processor 230 generates the route guidance information indicating a route along which the vehicle is to travel, based on a current position of the vehicle and a road on which the vehicle is currently travelling.

The route guidance information is information that guides the user to travel based on a route set by the user. For example, the route guidance information includes a distance the user needs to go straight, and a turn at an intersection. The route is a path that the user is to go through from a point of departure to a destination. The route guidance content is content in which the route guidance information is visualized, and includes, for example, a number and a text indicating a distance the user needs to go straight, and an arrow indicating a turn at an intersection.

The indication start point of the route guidance content indicates a point at which the user is to perform an action corresponding to the route guidance content. For example, when the route guidance content is content indicating a turn at an intersection, for example, a left turn, the indication start point is an entrance point of the intersection at which the turn is made. The indication end point of the route guidance content indicates a point at which the action corresponding to the route guidance content is terminated. For example, in a case in which the route guidance content is content indicating a turn at an intersection, the indication end point is an exit point of the intersection.

In an example, the processor 230 determines the indication start point and the indication end point based on road information included in a map database. For example, the processor 230 determines a turn region in which the turn is to be made based on the route guidance information provided to the vehicle, and determines an entrance point of the turn region to be the indication start point, and an exit point of the turn region to be the indication end point. The turn region is a region including a turn point.

In another example, the processor 230 adjusts a position of driving related content corresponding to an event, among a plurality of driving related contents, when the event is detected from the driving related information.

The driving related content is content related to driving, and includes, for example, information related to a speed, an acceleration, a position, fuel, and maintenance of the vehicle. The information related to fuel indicates a type of fuel used by the vehicle, a residual amount of gasoline of a gasoline vehicle, a residual amount of diesel of a diesel vehicle, a residual amount of hydrogen of a hydrogen vehicle, and an amount of charged power of an electric vehicle. The information related to the maintenance is information for determining whether the vehicle needs to be maintained, for example, a state of engine oil, a state of transmission fluid, a cumulative distance travelled, and a tire pressure. However, examples are not limited thereto.

An operation of the processor 230 will be further described below with reference to FIGS. 3 through 15.

The memory 240 temporarily or permanently stores the information for visualizing content. For example, the memory 240 stores instructions to be executed by the processor 230 to perform the operation described with reference to FIGS. 3 through 15. Further, the memory 240 stores the route guidance information, the route guidance content, the driving related content, and the map database. The map database is a database storing map data. Further details regarding the memory 240 is provided below.

In an example, the content visualizing device 200 is implemented as a three-dimensional (3D) HUD for a vehicle, or a navigation system providing a route for the vehicle. In another example, the content visualizing device 200 is implemented to provide AR to the user. For example, the content visualizing device 200 displays content to a depth within a range, for example, 10 meters (m) to 70 m from the vehicle, beyond a hood of the vehicle. As described below with reference to FIGS. 3 through 15, the content visualizing device 200 prevents a depth mismatching of views, thereby alleviating a visual fatigue of the user and providing visualizing content to a more accurate depth to assist the user to focus on driving.

Figure 3:
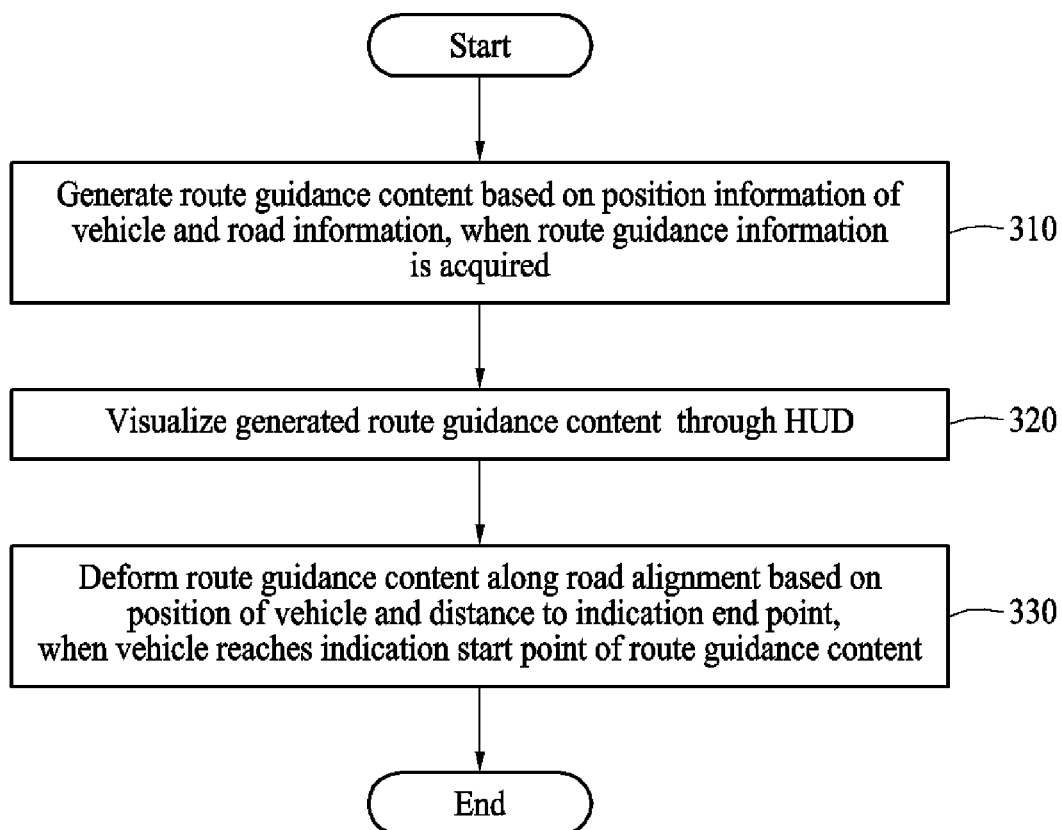
FIGS. 3 and 4 illustrate an example of a content visualizing method.

FIG. 3 briefly illustrates the content visualizing method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a processor of a content visualizing device generates route guidance content based on position information of a vehicle and road information, when route guidance information is acquired. In an example, the processor acquires the route guidance information in response to a control of a user. For example, when the user sets a destination, the processor generates the route guidance information to guide a route from a current position to the destination, based on the road information included in a map database.

The map database is a database storing map data. The map data includes the road information, such as, for example, a road on which the vehicle is to travel, a width of the road, the number of lanes of the road, a width of each lane, a center line, a turn point, a traffic signal, and other traffic related information. Further, the map data includes center waypoints disposed at intervals along the center line of the road, and lane waypoints disposed at intervals along a center of each lane. The content visualizing device determines a route along which the vehicle is to travel based on the waypoints, and fits the route guidance content to at least a portion of the waypoints.

In operation 320, the content visualizing device visualizes the generated route guidance content in front of the user through a HUD. The content visualizing device visualizes the route guidance content in a left image and a right image as graphic objects having a disparity, and provides the route guidance content through a projection plane. The content visualizing device provides the left image to a left eye of the user and the right image to a right eye of the user through the projection plane formed by the HUD. The content visualizing device provides the route guidance content having a depth as a 3D graphic object.

In operation 330, the processor of the content visualizing device deforms the route guidance content along a road alignment based on a position of the vehicle and a distance to an indication end point, when the vehicle reaches an indication start point of the route guidance content. For example, the content visualizing device changes a shape, a length, and a height of the route guidance content in response to a change in the position of the vehicle, in a section between the indication start point and the indication end point, thereby providing the natural route guidance content to the user.

Figure 4:
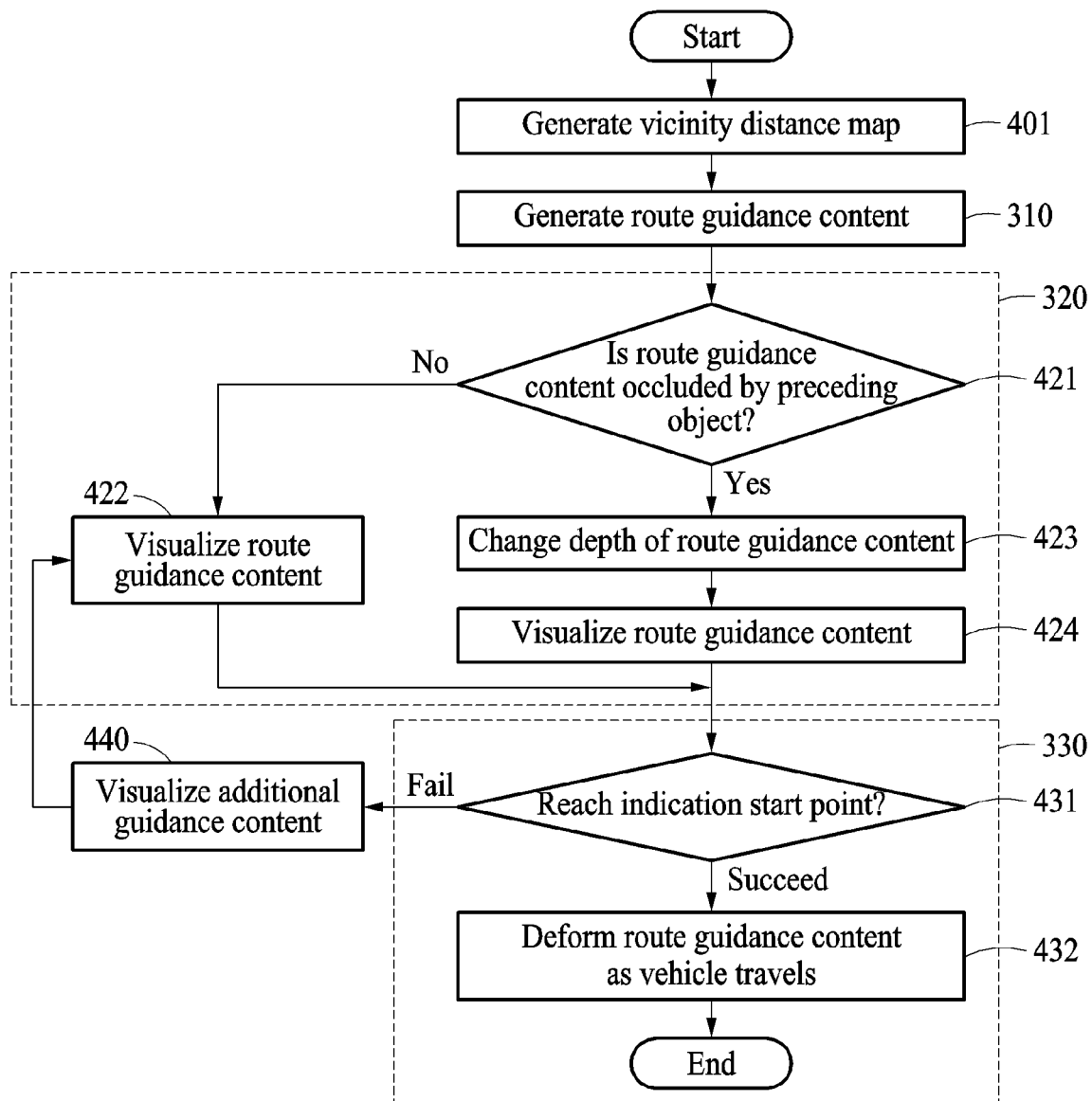

FIG. 4 illustrates an example the content visualizing method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 401, the content visualizing device generates a vicinity distance map. A sensor of the content visualizing device measures a distance to an object or a background in a vicinity. The processor of the content visualizing device generates the vicinity distance map indicating the distance to the object or the background, around an apparatus on which the content visualizing device is mounted, such as, for example, a vehicle.

In operation 310, the content visualizing device generates route guidance content similar to that as described with reference to FIG. 3. The content visualizing device acquires route guidance information corresponding to a control of a user, and generates the route guidance content corresponding to a current position based on the route guidance information. For example, the user inputs a destination through the control, and the content visualizing device acquires the route guidance information to guide a route to the corresponding destination. The content visualizing device generates the route guidance content indicating a direction, for example, a turn or a straight advance, to proceed along the route from the current position to the corresponding destination.

In operation 421, the content visualizing device determines whether the route guidance content is occluded by a preceding object. The content visualizing device determines whether a depth of the route guidance content is greater than a distance from the user to the preceding object. In an example, occlusion refers to the user recognizing content visualized by the content visualizing device as being occluded or overlapped by a real object when a depth of the content is greater than a distance to the real object.

In operation 422, the content visualizing device visualizes the route guidance content when the route guidance content is not occluded by the preceding object. The content visualizing device visualizes the route guidance content without changing the depth, when the depth of the route guidance content being less than the distance to the preceding object.

In operation 423, the content visualizing device changes the depth of the route guidance content when route guidance content is occluded by the preceding object. The content visualizing device determines the depth of the route guidance content to be less than the distance from the user to the preceding object when the route guidance content is occluded by the preceding object.

The route guidance content visualized to be farther than the preceding object is supposed to be occluded by the preceding object, and thus, invisible to the user. However, a virtual image including the route guidance content is formed by the HUD, and the route guidance content occluded by the preceding object may cause a crosstalk to the user. The user may get confused when simultaneously recognizing the route guidance content that is supposed to be invisible and the preceding object at a closer position. The content visualizing device changes the depth of the route guidance content to be less than the distance to the preceding object, thereby preventing a crosstalk.

In operation 424, the content visualizing device visualizes the route guidance content with the adjusted depth. The depth-adjusted route guidance content is visualized by the content visualizing device to not be occluded or overlapped by the preceding object.

In operation 431, the content visualizing device determines whether the vehicle reaches the indication start point. In an example, the content visualizing device determines whether the vehicle reaches the indication start point based on a distance between a current position of the apparatus, for example, the vehicle, and the indication start point being less than a threshold.

In operation 432, when the vehicle reaches the indication start point, the content visualizing device deforms the route guidance content as the vehicle travels. The content visualizing device fits the route guidance content to the current position of the vehicle and the indication end point along the road alignment, while the vehicle is travelling along the route from the indication start point to the indication end point. When the route guidance content is an arrow content indicating a turn, the content visualizing device conforms a start portion of the arrow content to the current position, and conforms an end portion of the arrow content to the indication end point.

In operation 440, the content visualizing device visualizes additional guidance content when the vehicle has not reached the indication start point. The content visualizing device provides the user with the additional guidance content corresponding to a direction in which the vehicle is currently travelling, while maintaining the route guidance content, when the vehicle is proceeding along a route different from the route guidance information. As described above, the content visualizing device visualizes the additional guidance content indicating that the vehicle is currently travelling in an incorrect direction, thereby enabling the user to recognize a driving error of the vehicle. Further, even after the vehicle passes the indication start point, the content visualizing device provides the additional guidance content to the user while maintaining the route guidance content when the vehicle proceeds along a route different from the route guidance information.

FIGS. 5 through 8 illustrate examples of deforming route guidance content.

Figure 5:
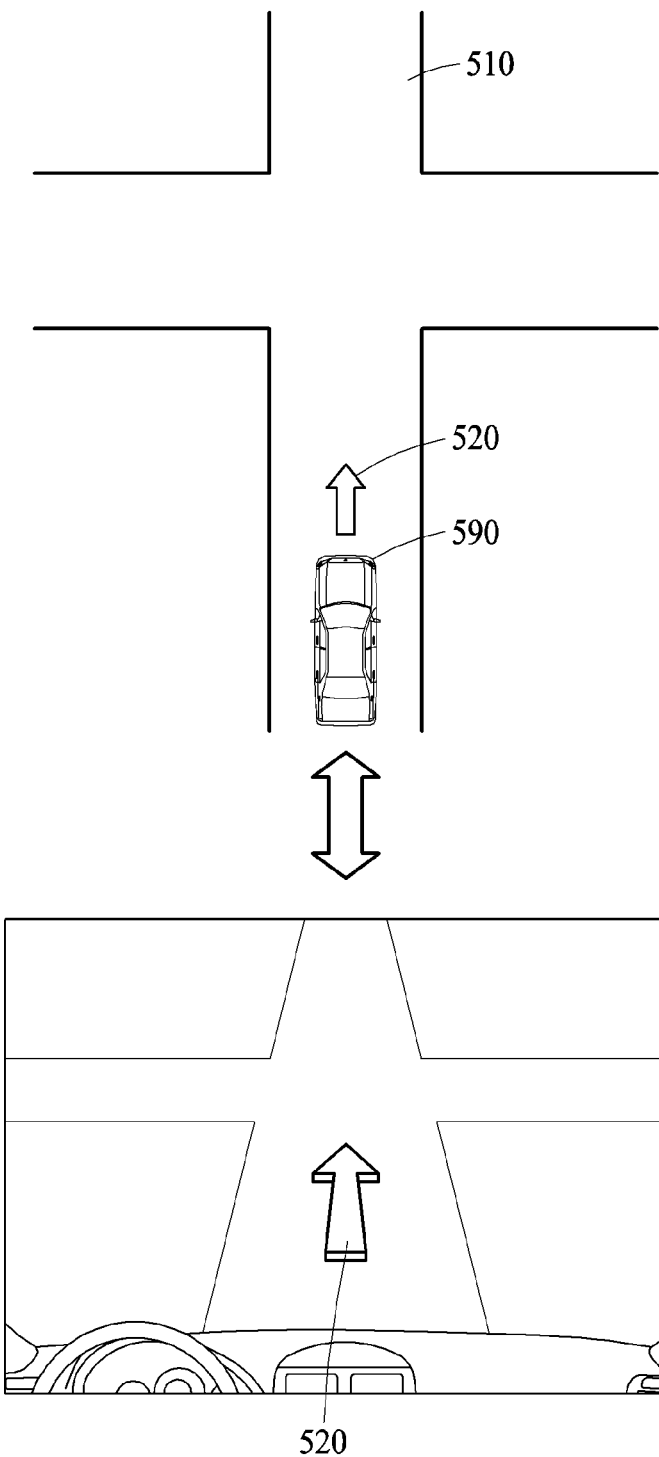
FIGS. 5 through 8 illustrate examples of deforming route guidance content.

FIG. 5 illustrates an example of route guidance content 520. In FIG. 5, a content visualizing device is mounted on a vehicle 590. An upper image of FIG. 5 is a top view illustrating a relationship between the vehicle 590 and a road 510, and a lower image of FIG. 5 illustrates a view 530 of a user.

In an example, the vehicle 590 is travelling forward on the road 510. Route guidance information indicates a straight advance, and the content visualizing device visualizes the route guidance content 520 indicating a straight advance. The content visualizing device stereoscopically visualizes the route guidance content 520 in the view 530 of the user. The content visualizing device forms a projection plane on which a virtual image is focused through windshield glass of the vehicle 590, and visualizes the route guidance content 520 through the projection plane.

When the route guidance information indicates a straight advance with respect to a current position of the vehicle 590, the content visualizing device sets an indication start point to a point a first distance spaced apart from the vehicle 590, and sets an indication end point to be a point a second distance spaced apart from the vehicle 590, the second distance being greater than the first distance. In an example, the first distance is designed with a diminutive length, and the second distance is designed with a maximum visible distance that may be perceived by the user or a maximum depth that may be implemented by the content visualizing device. However, examples are not limited thereto and other lengths of the first distance and the second distance may be used without departing from the spirit and scope of the illustrative examples described.

The content visualizing device dynamically changes the indication start point and the indication end point when the vehicle 590 travels, as described above, thereby providing the route guidance content 520 fit to a road alignment. Thus, the content visualizing device provides the user with the route guidance content 520 generated more intuitively based on the road alignment.

Figure 6:
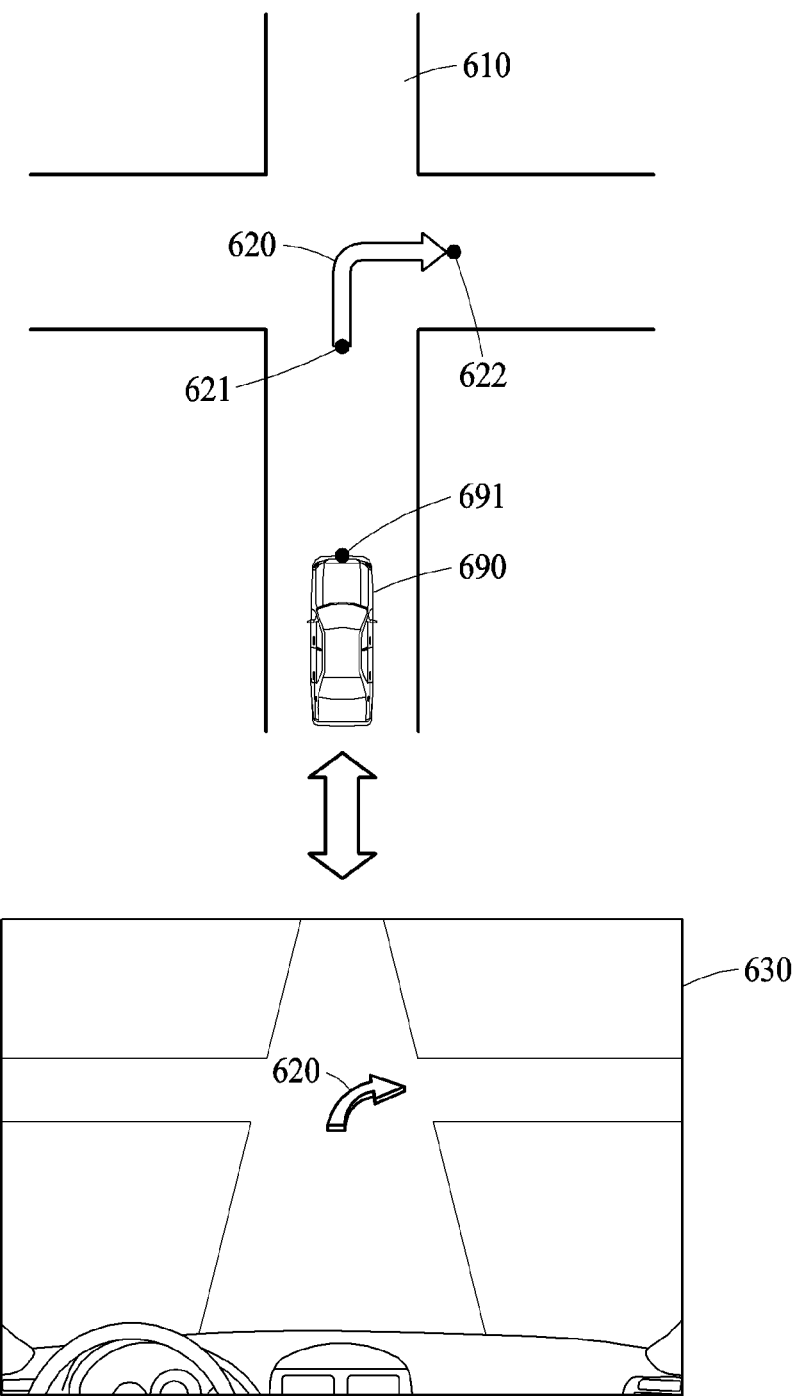

FIG. 6 illustrates an example of providing route guidance information indicating a right turn at an intersection far ahead. An upper image of FIG. 6 is a top view illustrating a relationship between a vehicle 690 and a road 610, and a lower image of FIG. 6 illustrates a view 630 of a user.

For example, the vehicle 690 travelling on the road 610 is advancing toward an intersection. Route guidance information indicates a right turn, and a content visualizing device visualizes route guidance content 620 indicating a right turn. The content visualizing device stereoscopically visualizes the route guidance content 620 in the view 630 of the user.

As shown in FIG. 6, the content visualizing device disposes the route guidance content 620 on a ground surface between an indication start point 621 and an indication end point 622. The content visualizing device provides the route guidance content 620 in a form that adheres to the ground surface. The content visualizing device disposes the route guidance content 620 in a region between the indication start point 621 and the indication end point 622, thereby enabling the user to more intuitively recognize a point to initiate a turn, although a current position 691 changes as the vehicle 690 proceeds.

The content visualizing device determines positions of the indication start point 621 and the indication end point 622 in a turn region through a sensor, for example, a camera, a GPS, or a LIDAR. When the indication start point 621 of the turn appears at a distance ahead of the vehicle 690, for example, 50 meters (m) ahead from the vehicle 690, the content visualizing device disposes the route guidance content 620 in advance by matching the route guidance content 620 to a position at which the vehicle is to make a turn in a real world.

Figure 7:
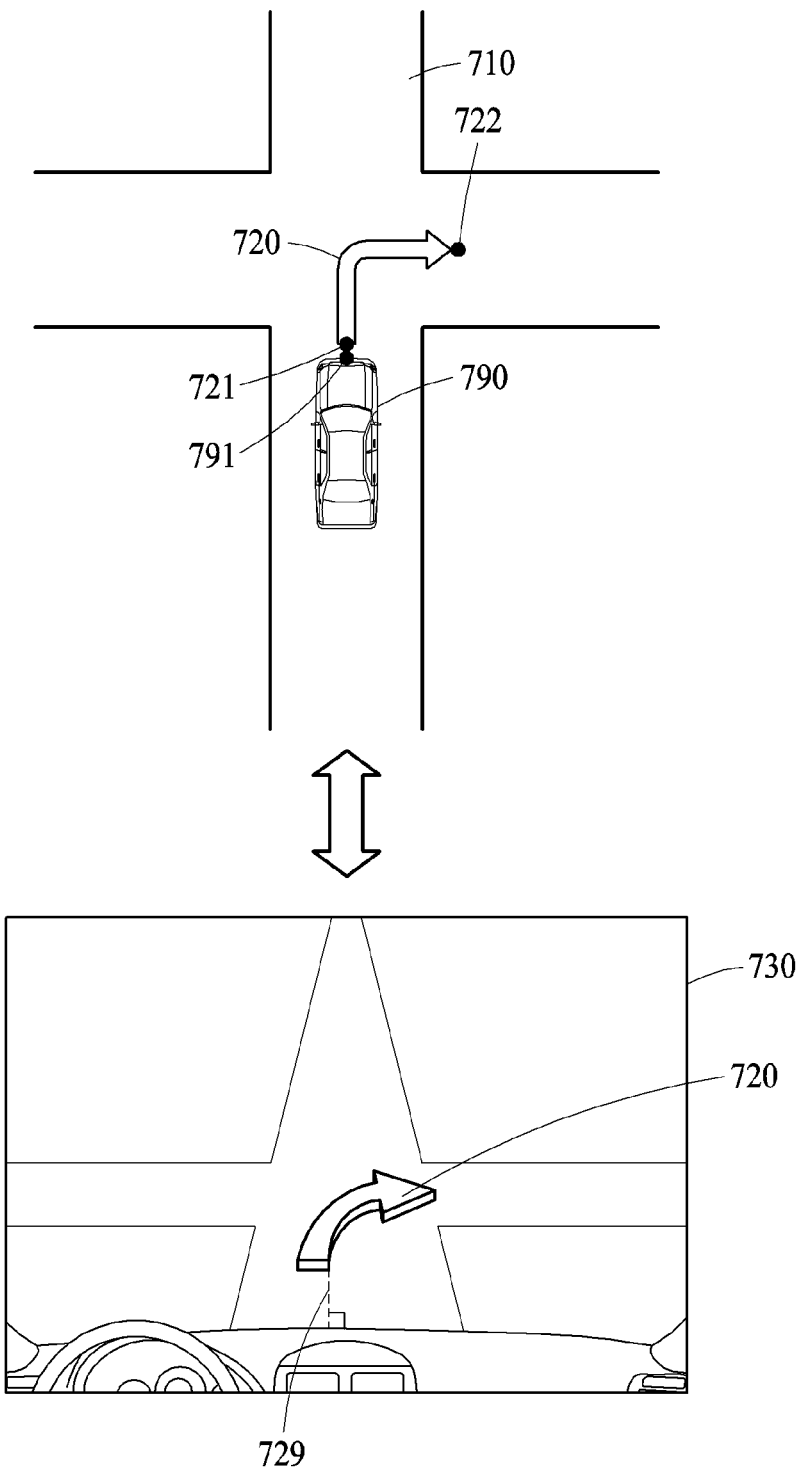

FIG. 7 illustrates an example of providing route guidance information indicating a right turn when a vehicle 790 is close to an intersection. An upper image of FIG. 7 is a top view illustrating a relationship between the vehicle 790 and a road 710, and a lower image of FIG. 7 illustrates a view 730 of a user.

For example, the vehicle 790 travelling on the road 710 is entering an intersection. Route guidance information indicates a right turn at the intersection, and a content visualizing device adjusts route guidance content 720 indicating a right turn. The content visualizing device increases a height 729 of the route guidance content 720 from a ground surface, when a distance from the vehicle 790 to an indication start point 721 is less than or equal to a threshold. As shown in the top view, the content visualizing device maintains a 2D position of the route guidance content 720 between the indication start point 721 and an indication end point 722. The 2D position of the route guidance content 720 is a planar position excluding the height 729. For example, when the height 729 of the route guidance content 720 is defined as a z axis, the 2D position of the route guidance content 720 is defined as an x axis and a y axis. The x axis, the y axis, and the z axis are orthogonal to each other.

When a current position 791 of the vehicle 790 is close to the indication start point 721 and the route guidance content 720 adheres to the ground surface, the route guidance content 720 is occluded by a hood of the vehicle 790. When the current position 791 of the vehicle 790 is close to the indication start point 721, the content visualizing device increases the height 729 of the route guidance content 720, thereby enabling the user to recognize the route guidance content 720.

When it is difficult to secure a view due to a vehicle or other objects occluding the view in front, the content visualizing device decreases a depth expression of the route guidance content 720, for example, a length of the route guidance content 720, and increases the height 729 of the route guidance content 720 while conforming map data to coordinates, thereby inducing a view of the user to be secured.

Figure 8:
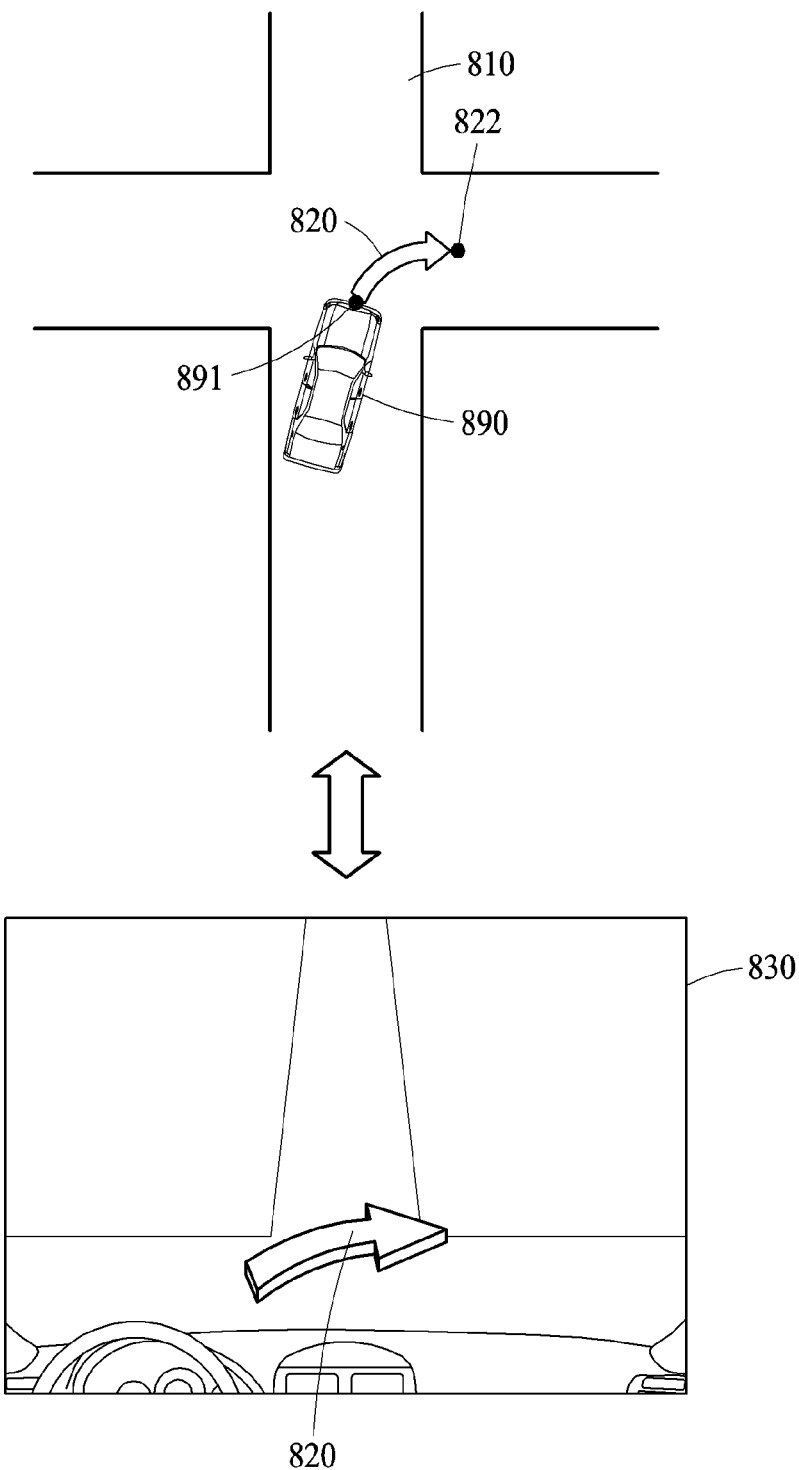

FIG. 8 illustrates an example of providing route guidance information indicating a right turn while a vehicle 890 is crossing an intersection. An upper image of FIG. 8 is a top view illustrating a relationship between the vehicle 890 and a road 810, and a lower image of FIG. 8 illustrates a view 830 of a user.

For example, the vehicle 890 travelling on the road 810 is crossing an intersection. Route guidance information indicates a right turn at the corresponding intersection, and a content visualizing device deforms route guidance content 820 indicating a right turn. When the vehicle 890 passes an indication start point and approaches an indication end point 822, the content visualizing device bends the route guidance content 820 along an alignment of the road 810 and a proceeding direction of the vehicle 890 from a current position 891 of the vehicle 890 to the indication end point 822. The content visualizing device visualizes the route guidance content 820 in a form of being bent from the current position 891 of the vehicle 890 to the indication end point 822 along an alignment of a route corresponding to the right turn. The content visualizing device expresses, to the user, that a turn is being made in a direction conforming to the route guidance information, through a deformed animation of the route guidance content 820.

As shown in the top view of FIG. 8, a length of arrow content corresponding to the right turn decreases gradually as the vehicle 890 proceeds. The content visualizing device provides the route guidance content 820 that is gradually bent as the vehicle 890 proceeds in the view 830 of the user, thereby enabling the user to intuitively recognize a progress of the turn.

In the examples of FIGS. 5 and 8, the content visualizing device determines the indication start point and the indication end point along a center of a lane region to which the vehicle is to proceed based on the route guidance information. Thus, in an example, the content visualizing device induces the user to drive toward the center of the lane region from the current position of the user.

Figure 9:
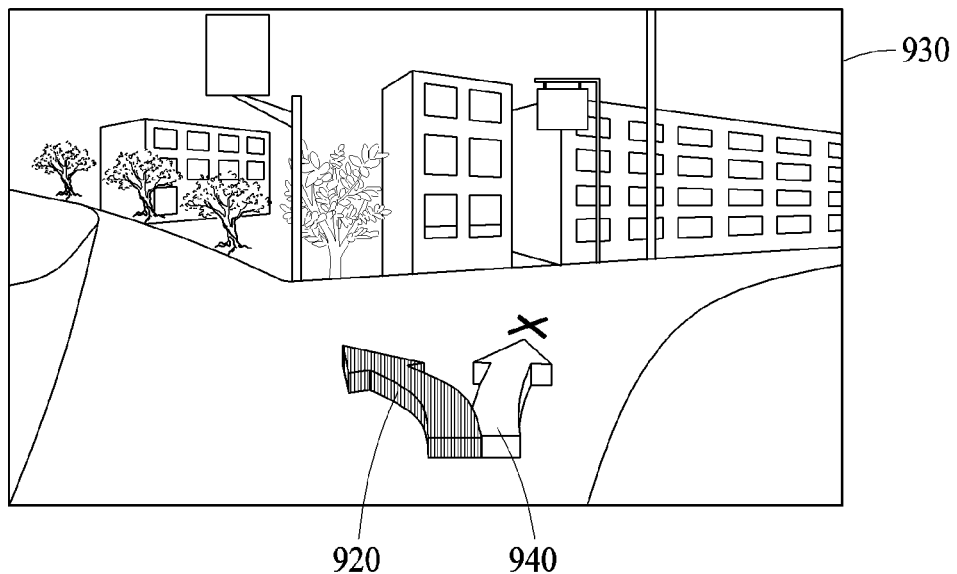
FIG. 9 illustrates an example of visualizing additional content.

FIG. 9 illustrates an example of visualizing additional content.

FIG. 9 illustrates a view 930 of a user recognizing route guidance content 920 provided by a content visualizing device at an intersection. FIG. 9 illustrates a situation in which a user is making a right turn although the user is supposed to make a left turn at an intersection.

The content visualizing device visualizes driving direction content 940 as additional content, together with the route guidance content 920, when a vehicle departs from a route corresponding to route guidance information. As shown in the view 930 of FIG. 9, the content visualizing device visualizes the driving direction content 940 while maintaining the route guidance content 920.

Further, when error information is calculated from a position of the vehicle and the route guidance information is less than or equal to a threshold error, the content visualizing device deforms the route guidance content 920. For example, the content visualizing device calculates the error information between a route along which the vehicle is proceeding and the route corresponding to route guidance information, and maintains visualization while deforming the route guidance content 920 and additionally visualizes the driving direction content 940 while the error information is less than or equal to the threshold error. Thus, the content visualizing device alerts the user of a driving error when the vehicle does not greatly departing from the route corresponding to the route guidance information.

Furthermore, when the error information exceeds the threshold error, the content visualizing device terminates deformation of the route guidance content 920 and generates new route guidance content. Thus, when the vehicle on which the content visualizing device is mounted proceeds along an incorrect route and is unable to travel along the route corresponding to the route guidance information, the content visualizing device excludes the route guidance content 920 corresponding to the existing route guidance information, and visualizes the new route guidance content corresponding to new route guidance information.

Figure 10:
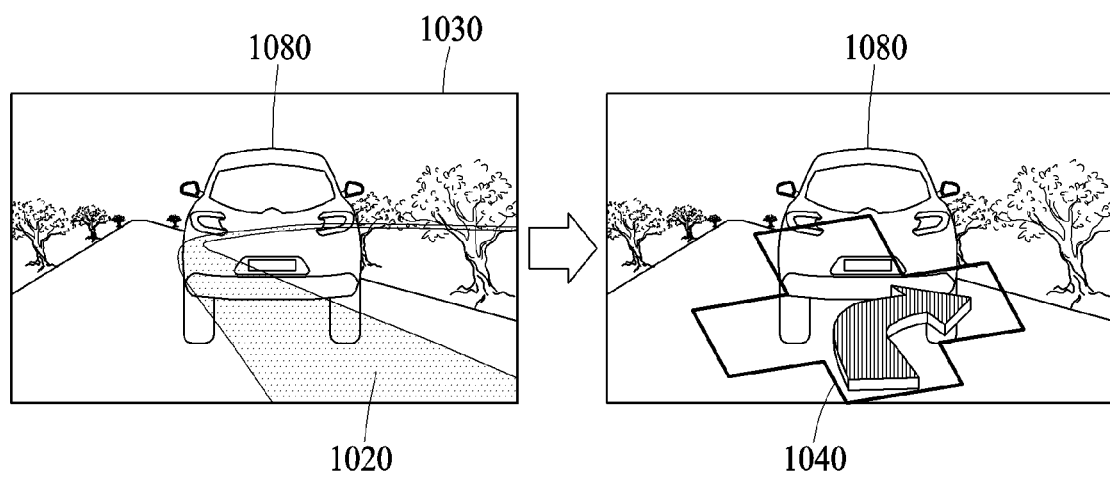
FIG. 10 illustrates an example of providing summary content.

FIG. 10 illustrates an example of providing summary content 1040.

Referring to FIG. 10, when route guidance content 1020 is occluded by a preceding object 1080, a content visualizing device visualizes the summary content 1040 corresponding to the route guidance content 1020 to a depth less than a distance to the preceding object 1080.

FIG. 10 illustrates a case in which the preceding object 1080 cuts in front of a vehicle while the content visualizing device is visualizing arrow content that extends to an intersection far ahead based on route guidance information. The content visualizing device generates the summary content 1040 corresponding to the route guidance content 1020 indicating a right turn at the intersection. The summary content 1040 is content that summarizes the route guidance content 1020, the content indicating information such as a road alignment, a number of lanes of a road, a turn, and a distance to an indication start point. In FIG. 10, the summary content 1040 is content indicating a right turn at the intersection that is occluded by the preceding object 1080. The content visualizing device determines the depth of the summary content 1040 to be less than the distance to the preceding object 1080, thereby minimizing a crosstalk occurring in a view 1030 of a user.

Figure 11:
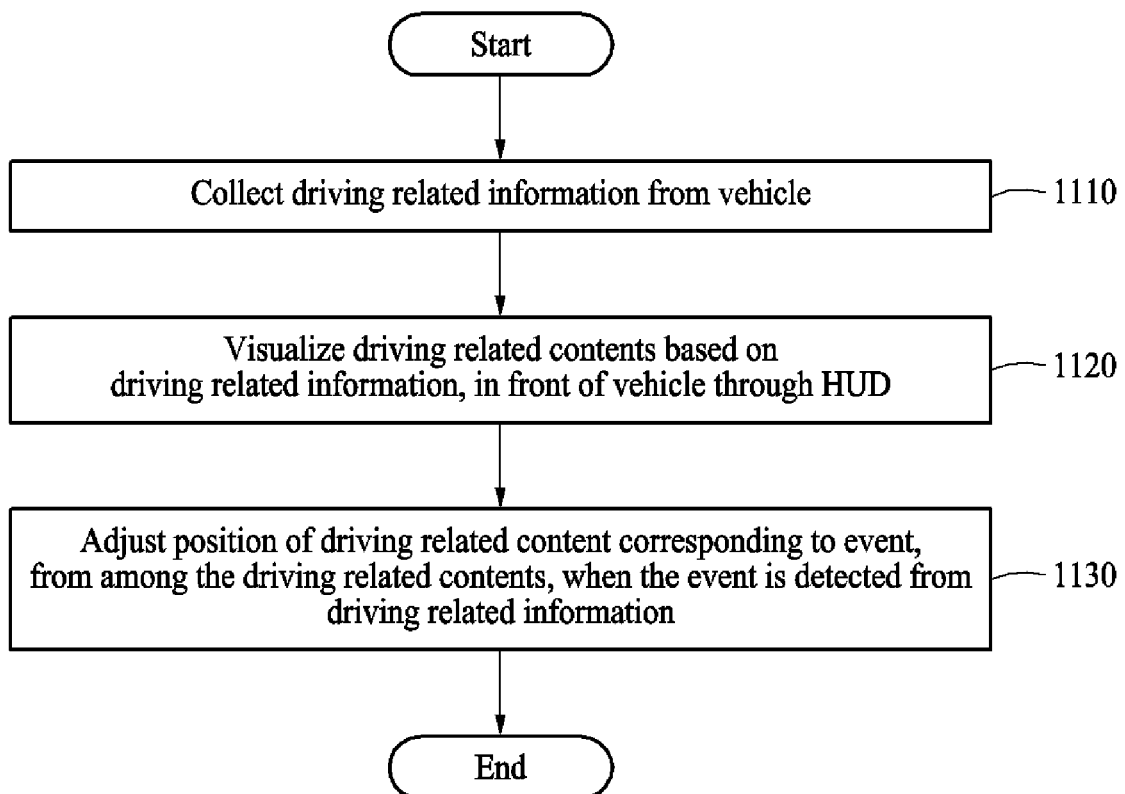
FIG. 11 illustrates an example of a content visualizing method.

FIG. 11 illustrates an example of a content visualizing method. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Referring to FIG. 11, in operation 1110, a content visualizing device collects driving related information from a vehicle. The content visualizing device collects information related to a speed, an acceleration, a position, fuel, and a maintenance of the vehicle. Further, the content visualizing device detects an event based on the collected information.

The event is a situation in which the driving related information satisfies a condition, such as, for example, an event based on attribute information, a battery charge event, a refuel event, a speeding event, a slowing event, a component replacement event, an engine oil changing event, a maintenance event, a safety event, a breakdown event, and a route guide event. However, the types of the event are not limited thereto, and various events may be set based on a design.

The battery charge event indicates a state in which a residual amount of a battery is below a threshold residual amount. The refuel event indicates a state in which a residual amount of gasoline is below a threshold residual amount. The speeding event indicates a state in which a speed of a vehicle exceeds a maximum speed limit with respect to a road on which the vehicle is currently travelling. The slowing event indicates a state in which a speed of a vehicle is below a minimum speed limit with respect to a road on which the vehicle is currently travelling. The component replacement event indicates a state in which one or more components of an apparatus on which a content visualizing device is mounted needs to be replaced. The engine oil changing event indicates a state in which engine oil of a vehicle needs to be replaced. The maintenance event indicates a state in which a portion of a vehicle needs to be maintained. The safety event indicates a state in which information related to a safety of a user, for example, an accident hazard zone, needs to be provided. The breakdown event indicates a state in which a portion of an apparatus on which a content visualizing device is mounted breaks down. The route guide event indicates a state in which a route along which a vehicle on which a content visualizing device is mounted needs to travel is to be guided at a position. A point of interest (POI) event indicates a state in which a vehicle approaches a POI.

When a residual amount of a battery or gasoline of a travelling vehicle is below the threshold residual amount, the content visualizing device detects the battery charge event or the refuel event.

In operation 1120, the content visualizing device visualizes a plurality of driving related contents based on the driving related information in front of the vehicle through a HUD. The content visualizing device provides a left image to a left eye of the user and a right image to a right eye of the user through a projection plane formed by the HUD.

In operation 1130, when an event is detected from the driving related information, the content visualizing device adjusts a position of driving related content corresponding to the event from among the driving related contents.

The content visualizing device selects target content from among the driving related contents based on the detected event. The target content is content mapped to a type of the detected event, among the driving related contents. In an example, the content visualizing device adjusts and visualizes the target content to a depth determined based on the event. The depth to which the target content is visualized is determined based on the type of the event.

For example, when the battery charge event or the refuel event is detected, the content visualizing device adjusts a position of battery residual amount content or gasoline residual amount content as driving related content corresponding to the battery charge event or the refuel event, among the driving related contents. For example, the content visualizing device moves the driving related content corresponding to the detected event to a depth corresponding to a region to which the user pays greater attention in a view.

Figure 12:
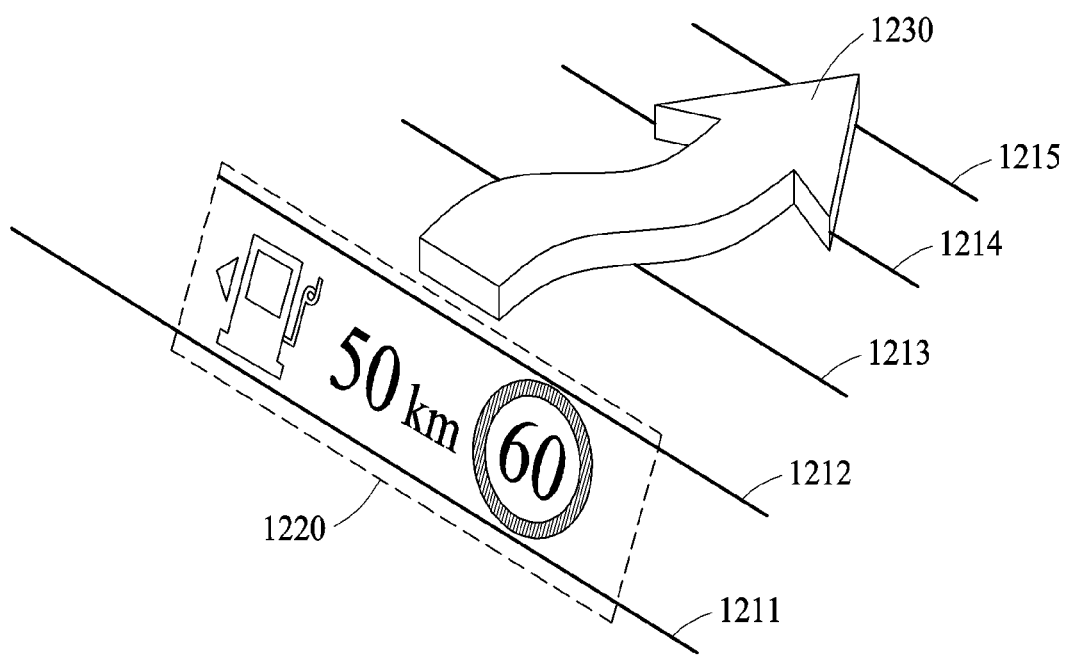
FIGS. 12 and 13 illustrate examples of dynamically visualizing driving related information.
Figure 13:
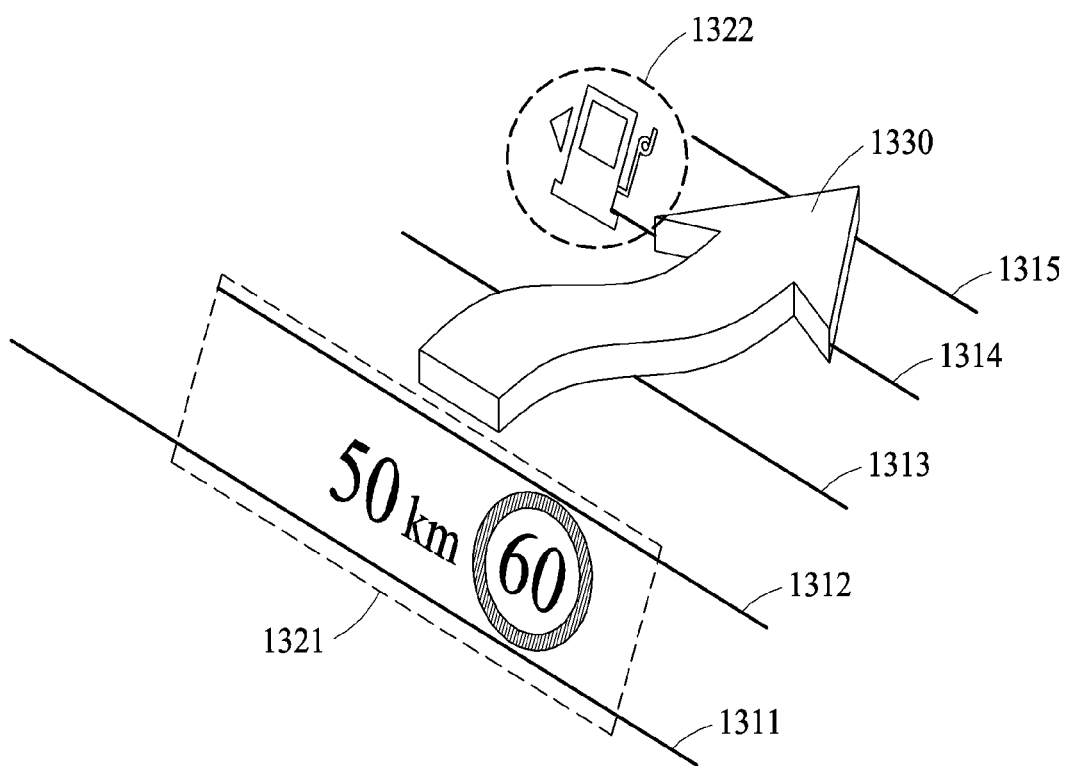

FIGS. 12 and 13 illustrate examples of dynamically visualizing driving related information.

In FIGS. 12 and 13, lines indicating a plurality of depths 1211, 1212, 1213, 1214, and 1215 are illustrated for ease of description. However, the corresponding lines do not need to be visualized in a view of a user.

Referring to FIG. 12, a content visualizing device visualizes a plurality of driving related contents 1220. The content visualizing device also visualizes route guidance content 1230 as a 3D graphic representation having successive depths 1212, 1213, 1214, and 1215.

Referring to FIG. 13, the content visualizing device moves driving related content 1322 from a first depth 1311 to a second depth 1314, in response to an event being initiated. The first depth 1311 is a depth closer to the user than the second depth 1314. At the same time, the content visualizing device maintains route guidance content 1330 visualized to successive depths 1312, 1313, 1314, and 1315 and remaining driving related contents 1321 visualized to the first depth 1311. Thus, the content visualizing device adjusts the depth of the driving related content 1322 while an event occurs, thereby enabling the user to pay more attention to the driving related content 1322.

Further, the content visualizing device moves the driving related content 1322 from the second depth 1314 to the first depth 1311, when the event is terminated. When the event is terminated, the content visualizing device returns the driving related content 1322 to the original position, thereby reducing clutter of information to the user.

Figure 14:
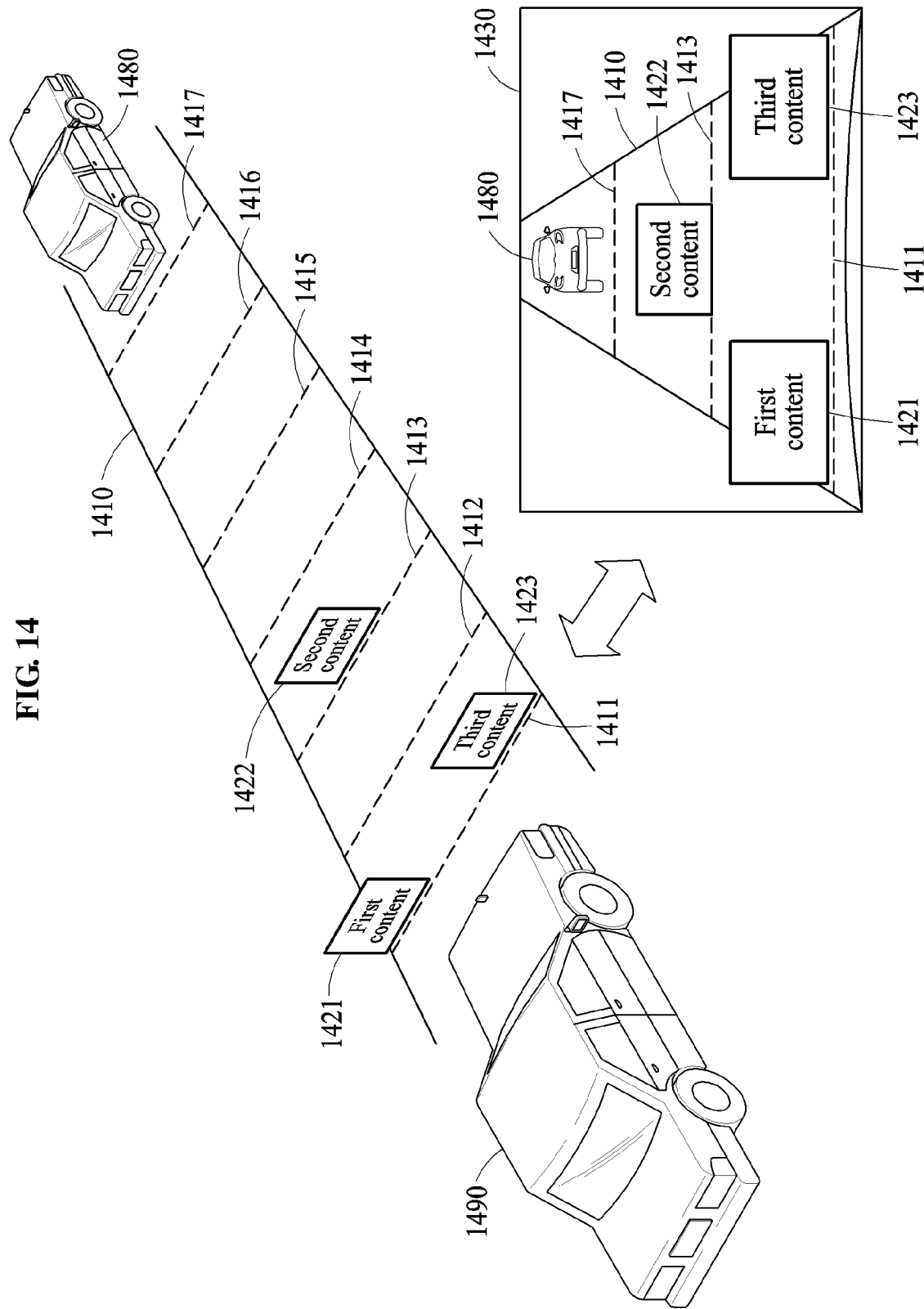

FIGS. 14 and 15 illustrate examples of adjusting a depth of driving related content when an event is detected.

Referring to FIG. 14, a content visualizing device visualizes a plurality of driving related contents 1421, 1422, and 1423. FIG. 14 discontinuously illustrates 7 lines corresponding to a plurality of depths 1411 through 1417 to which content is to be implemented by the content visualizing device. However, examples are not limited thereto. The example of FIG. 14 is provided for ease of description. The content visualizing device may also visualize content to successive depths.

The content visualizing device visualizes at least a portion of the plurality of driving related contents to a first depth 1411. For example, the content visualizing device visualizes first content 1421 and third content 1423 to the first depth 1411. The content visualizing device visualizes a remaining portion of the plurality of driving related contents to a second depth 1413 different from the first depth 1411. For example, the content visualizing device visualizes second content 1422 to the second depth 1413. In an example, the content visualizing device may display the plurality of driving related contents for each depth based on a priority.

A user in a vehicle 1490 recognizes, through a view 1430 that the first content 1421 and the third content 1423 exist at the first depth 1411, and the second content 1422 exists at the second depth 1413. Further, the user recognizes, through the view 1430, that a preceding object 1480 travelling on the same road 1410 exists at a third depth 1417.

The content visualizing device visualizes at least a portion of the plurality of driving related contents to a depth corresponding to a focus of the user. The content visualizing device tracks a gaze of the user, estimates a distance to a point that the gaze of the user reaches, and determines the estimated distance to the depth corresponding to the focus of the user. In the example of FIG. 14, it is assumed that the user gazes at a point corresponding to the second depth 1413 on the road 1410. The content visualizing device determines the focus of the user to correspond to the second depth 1413 by tracking the gaze of the user. The content visualizing device measures a distance to the point that the tracked gaze reaches on the road. The content visualizing device visualizes the second content 1422 to the second depth 1413 corresponding to the focus of the user.

FIG. 15 illustrates an example of adjusting the content of FIG. 14. Similar to FIG. 14, in an example, lines corresponding to a plurality of depths 1511 through 1517 to which content is to be implemented by a content visualizing device are provided.

When an event is terminated, the content visualizing device visualizes driving related content associated with the corresponding event to the original depth. For example, when an event associated with second content 1522 provided at a second depth 1514 is terminated, the content visualizing device restores the second content 1522 to a first depth 1511, as shown by an arrow 1551.

When a new event is detected, the content visualizing device adjusts a position of driving related content corresponding to the event. When an event is detected, the content visualizing device moves driving related content corresponding to the detected event to a depth corresponding to a focus of a user. The content visualizing device tracks a gaze of the user, estimates a distance to a point that the gaze of the user reaches, and determines the estimated distance to the depth corresponding to the focus of the user.

For example, FIG. 15 illustrates a situation in which a user of a vehicle 1590 gazes at a preceding object 1580 travelling on a road 1510. The preceding object 1580 proceeds ahead while being spaced at a distance corresponding to a third depth 1517 from the user. The content visualizing device selects third content 1523, for example, a fuel gauge interface, visualized to the first depth 1511, when an event, such as, a refuel event, is detected. The content visualizing device tracks the gaze of the user, and determines a distance to a point that the gaze of the user reaches to be the third depth 1517. The content visualizing device moves the third content 1523 from the first depth 1511 to the third depth 1517, as shown by an arrow 1552.

Thus, when an event occurs, the content visualizing device visualizes information requiring attention of the user to a depth corresponding to the focus of the user in a view 1530 of the user, for example, the third depth 1517 of FIG. 15.

The content visualizing device 200, and other apparatuses, units, modules, devices, and other components described herein with respect to FIG. 2 are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-4 and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A content visualizing method, comprising:
   generating route guidance content based on position information of a vehicle and road information;
   displaying, through a projection plane of a head-up display (HUD), the generated route guidance content between an indication start point at a first distance from the vehicle and an indication end point at a second distance further from the vehicle; and
   deforming the displaced route guidance content along a road alignment in response to the first distance being less than or equal to a threshold, the indication start point being a point at which the displayed route guidance content indicates the vehicle is to begin to perform an action:
   determining a focus of the user by tracking a gaze of the user and estimating a distance to a point that the gaze of the user reaches;
   determining the estimated distance to be a depth, corresponding to the focus of the user, in the projection plane; and
   displaying the deformed route guidance content to the depth in the projection plane;
   further adjusting the depth and the adjusting comprises:
   detecting an event based on driving related information from a plurality of events;
   selecting a first driving related content from among the driving related information based on the detected event;
   moving the selected first driving related content from a first depth to a second depth, the second depth being different from the first depth; and
   moving the selected first driving related content from the second depth to the first depth, in response to the detected event being terminated.

2. The content visualizing method of claim 1, wherein the deforming of the route guidance content comprises bending the route guidance content along the road alignment and a proceeding direction of the vehicle from a position of the vehicle to an indication end point, in response to the vehicle passing the indication start point and approaching the indication end point.

3. The content visualizing method of claim 1, wherein the displaying comprises disposing the route guidance content on a ground surface between the indication start point and an indication end point.

4. The content visualizing method of claim 1, wherein the deforming comprises increasing a height of the route guidance content from the ground surface, in response to the distance from the vehicle to the indication start point being less than or equal to a threshold.

5. The content visualizing method of claim 1, wherein the deforming comprises:
   deforming the route guidance content, in response to error information calculated from a position of the vehicle and route guidance information being less than or equal to a threshold error; and
   terminating deformation of the route guidance content and generating new route guidance content, in response to the error information exceeding the threshold error.

6. The content visualizing method of claim 1, wherein the deforming comprises
   setting the indication start point to be a point a first distance from the vehicle, and setting an indication end point to be a point a second distance from the vehicle, in response to the route guidance content indicating a straight advance from a position of the vehicle, wherein the second distance is greater than the first distance.

7. The content visualizing method of claim 1, wherein the deforming comprises determining the indication start point and an indication end point along a center of a lane region to which the vehicle is to proceed based on the route guidance content.

8. The content visualizing method of claim 1, further comprising:
   displaying driving direction content together with the route guidance content, in response to the vehicle departing from a route corresponding to the route guidance content.

9. The content visualizing method of claim 1, wherein the deforming of the route guidance content comprises displaying summary content corresponding to the route guidance content at a depth less than a distance to a preceding object, in response to the route guidance content being occluded by the preceding object.

10. The content visualizing method of claim 1, wherein the generating of the route guidance content comprises generating the route guidance content, in response to acquisition of route guidance information.

11. A non-transitory computer-readable storage medium storing instructions that, when executed by one or more processors, cause the one or more processors to implement a method comprising:
   generating route guidance content based on position information of a vehicle and road information;
   displaying, through a projection plane of a head-up display (HUD), the generated route guidance content between an indication start point at a first distance from the vehicle and an indication end point at a second distance further from the vehicle; and
   deforming the displaced route guidance content along a road alignment in response to the first distance being less than or equal to a threshold, the indication start point being a point at which the displayed route guidance content indicates the vehicle is to begin to perform an action:
   determining a focus of the user by tracking a gaze of the user and estimating a distance to a point that the gaze of the user reaches;
   determining the estimated distance to be a depth, corresponding to the focus of the user, in the projection plane; and
   displaying the deformed route guidance content to the depth in the projection plane;
   further adjusting the depth and the adjusting comprises:

detecting an event based on driving related information from a plurality of events;
selecting a first driving related content from among the driving related information based on the detected event;
moving the selected first driving related content from a first depth to a second depth, the second depth being different from the first depth; and
moving the selected first driving related content from the second depth to the first depth, in response to the detected event being terminated.

12. A content visualizing method, comprising:
collecting driving related information from a vehicle;
displaying, through a projection plane of a head-up display (HUD), driving related contents based on the driving related information in front of the vehicle between an indication start point at a first distance from the vehicle and an indication end point at a second distance further from the vehicle;
adjusting a depth of a first driving related content of the displayed driving related contents in response to an event being detected based on the driving related information,
wherein the adjusting comprises:
  detecting the event based on the driving related information from a plurality of events;
  selecting the first driving related content from among the driving related contents based on the detected event;
  moving the selected first driving related content from a first depth to a second depth, the second depth being different from the first depth; and
  moving the selected first driving related content from the second depth to the first depth, in response to the detected event being terminated;
determining a focus of the user by tracking a gaze of the user and estimating a distance to a point that the gaze of the user reaches;
determining the estimated distance to be a depth, corresponding to the focus of the user, in the projection plane; and
displaying a second driving related content, of the displayed driving related contents, to the depth in the projection plane.

13. The content visualizing method of claim 12, wherein the displaying of the driving related contents comprises:
displaying at least a portion of the driving related contents to the first depth; and
displaying a remaining portion of the driving related contents to the second depth.

14. The content visualizing method of claim 12, wherein the displaying of the driving related contents comprises displaying at least a portion of the driving related contents to a depth corresponding to a focus of a user of the vehicle.

15. The content visualizing method of claim 12, wherein the adjusting comprises moving the driving related content the depth corresponding to the focus of a user of the vehicle.

16. The content visualizing method of claim 12, wherein the detecting of the event comprises:
detecting the event based on the driving related information comprising any one or any combination of a speed, an acceleration, a position, fuel, and a maintenance of the vehicle.

17. The content visualizing method of claim 12, wherein the displaying of the driving related contents comprises providing a left image to a left eye of a user of the vehicle and a right image to a right eye of the user of the vehicle through the projection plane formed by the HUD.

18. A content visualizing apparatus, comprising:
a processors configured to:
generate route guidance content based on position information of a vehicle and road information;
display, through a projection plane of a head-up display (HUD), the generated route guidance content between an indication start point at a first distance from the vehicle and an indication end point at a second distance further from the vehicle;
deform the displaced route guidance content along a road alignment in response to the first distance being less than or equal to a threshold, the indication start point being a point at which the displayed route guidance content indicates the vehicle is to begin to perform an action:
determine a focus of the user by tracking a gaze of the user and estimating a distance to a point that the gaze of the user reaches;
determine the estimated distance to be a depth, corresponding to the focus of the user, in the projection plane; and
display the deformed route guidance content to the depth in the projection plane;
further adjusting the depth and the adjusting comprises:
detect an event based on driving related information from a plurality of events;
select a first driving related content from among the driving related information based on the detected event;
move the selected first driving related content from a first depth to a second depth, the second depth being different from the first depth; and
move the selected first driving related content from the second depth to the first depth, in response to the detected event being terminated.

* * * * *